United States Patent [19]

Knechtel

[11] 4,353,638
[45] Oct. 12, 1982

[54] COPYING APPARATUS

[75] Inventor: Wilhelm Knechtel, Biebertal, Fed. Rep. of Germany

[73] Assignee: Canon Kabushiki Kaisha, Tokyo, Japan

[21] Appl. No.: 283,370

[22] Filed: Jul. 15, 1981

[51] Int. Cl.³ ............................................. G03G 15/28
[52] U.S. Cl. .......................................... 355/8; 355/11; 355/66; 355/46
[58] Field of Search .................. 355/8, 11, 66, 46, 3 R

[56] References Cited

U.S. PATENT DOCUMENTS 3,844,653 10/1974 Kelly .................................. 355/66 X
4,077,714 3/1978 Komori et al. .................... 355/66 X
4,247,192 1/1981 Komori et al. .................... 355/46 X
4,318,609 3/1982 Knechtel ............................ 355/11

Primary Examiner—Richard L. Moses

Attorney, Agent, or Firm—Fitzpatrick, Cella, Harper & Scinto

[57] ABSTRACT

The present invention is concerned with a copying apparatus of the type which is provided with a reciprocal scanner, and in which copy operation is carried out not only during the forward movement of the scanner but also during the backward movement of the scanner. The copying apparatus herein disclosed has a movable reflector which is interposed in the optical path at the time of forward movement or at the time of backward movement, and stationary reflector for further reflecting the beam coming from the original once reflected by said movable reflector. Said movable and stationary reflector cooperate with each other to invert the original image to be formed on a photosensitive medium at the time of backward movement or forward movement relative to the original image formed at the time of forward movement or backward movement.

6 Claims, 2 Drawing Figures

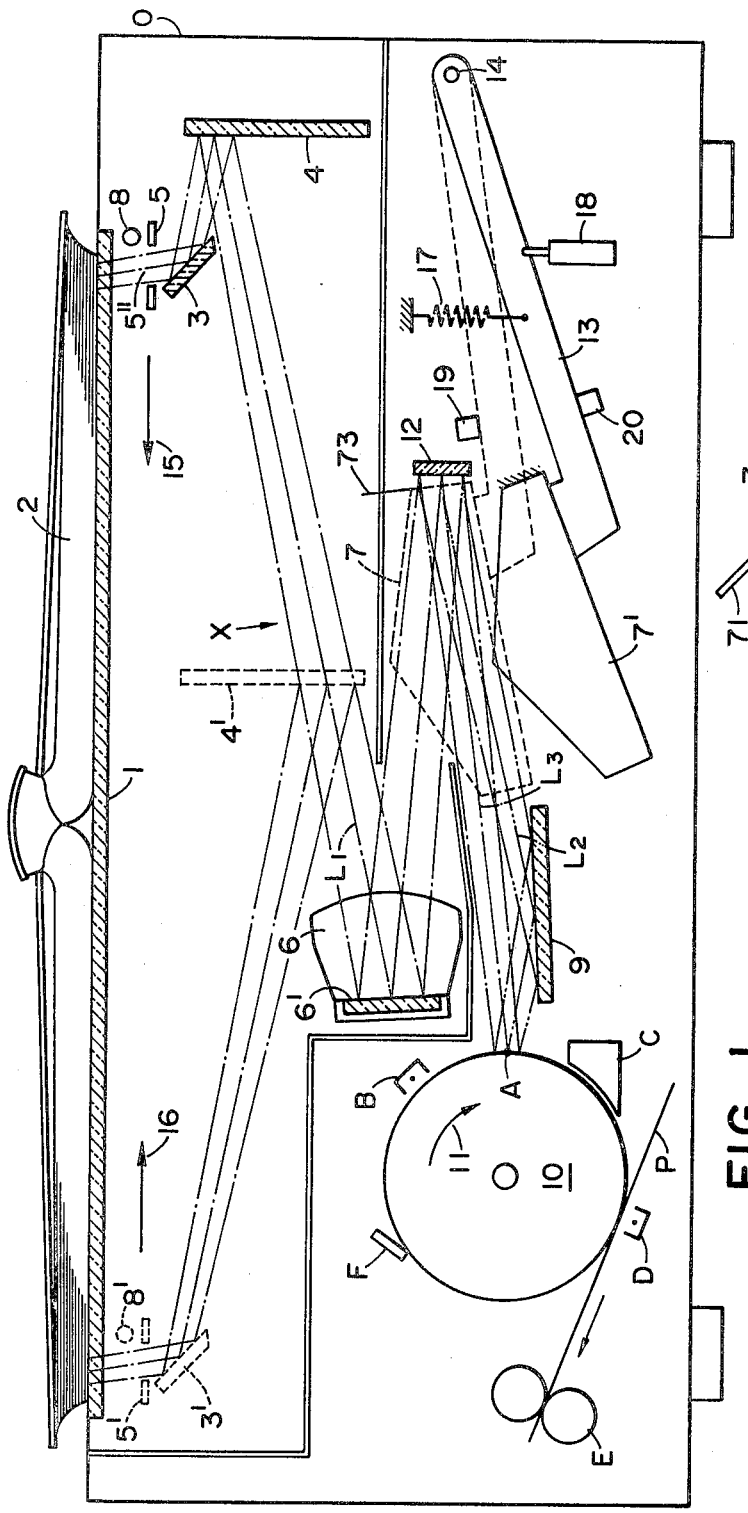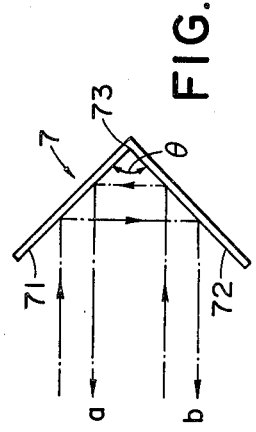
FIG. 1
FIG. 2

COPYING APPARATUS

BACKGROUND OF THE INVENTION

1. Field of the Invention

The present invention relates to a copying apparatus of the type in which an original to be copied is scanned and an image of the original is slit exposed on a photosensitive medium.

2. Description of the Prior Art

In an original scan type copying apparatus as mentioned above, the scanning of the original is carried out in various ways, for example, by reciprocally moving an original conveying means such as roller or belt together with the original or by reciprocally moving an original table on which the original has been placed or by moving optical elements such as mirrors or lenses along the original's fixed station. Usually, the original image is projected onto the photosensitive medium so as to make a copy from the original image only at the time of forward scanning. At the time of backward scanning of the original, the original image is not projected on the photosensitive medium. Therefore, the time necessary for the backward scanning is uselessly consumed and constitutes a loss of time. This is against the desire to increase the number of copies obtainable per unit of time.

To satisfy the above desire, many efforts have been made to provide a copying machine by which making a copy can be carried out not only during the forward scan time but also during the backward scan time. In fact, such a copying machine has already been disclosed in patent publications, for example, in German Pat. No. 2,527,381 and Japanese Pat. No. 17,380/1980. In the copying machines according to these prior arts there are used two roof mirrors for forward scanning and backward scanning of the original, respectively. These two roof mirrors are alternately interposed in and retracted from the optical path while keeping a proper relationship with the forward and backward scannings. As to the structure, these two roof mirrors are united together with the ridgeline of one roof mirror being orientated in the direction normal to that of the other roof mirror. With this arrangement, the images of the same original projected on the photosensitive medium at the time of forward scanning and at the time of backward scanning can be inverted 180° relative to each other.

This prior art copying apparatus has, however, some drawbacks.

Since the two roof mirrors must be moved together at the time of reversal of the scanning direction, it takes relatively long time from the end of forward scanning to the start of backward scanning. This is because the weight of these two roof mirrors is relatively large and therefore a relatively long time is required to move the roof mirrors. Of course, this is against the desire to further increase the copying speed. Another drawback of the apparatus is found in the fact that the apparatus is apt to generate a large vibration and therefore to get in trouble very often due to the large weight of two roof mirrors which must be moved at every change of original scanning direction.

SUMMARY OF THE INVENTION

Accordingly it is an object of the invention to provide a copying apparatus which produces copies not only during the forward scanning time but also during the backward scanning time and which is simple in structure.

It is another object of the invention to provide a copying apparatus which increases the number of copies obtainable per unit time as compared with the above mentioned apparatus according to the prior art.

It is a further object of the invention to provide a copying apparatus which reduces the vibration generated at the change of arrangement of the optical system to a great extent.

Other and further objects, features and advantages of the invention will appear more fully from the following description taken in connection with the accompanying drawings.

BRIEF DESCRIPTION OF THE DRAWINGS

FIG. 1 schematically shows an embodiment of the invention; and

FIG. 2 illustrates an example of the roof mirror used in the invention.

DESCRIPTION OF PREFERRED EMBODIMENTS

The copying apparatus shown in FIG. 1 has an original table 1 on which an original 2 to be copied such as a book or a sheet is stationarily placed. The original table 1 is made of transparent glass and fixedly mounted on the upper part of a machine frame 0 of the apparatus body. An optical image of the original 2 is projected onto a photosensitive medium 10 at the exposure position A by a projection optical system composed of plane mirrors 3, 4 an in-mirror lens 6 having a mirror 6' at its rear portion, and a plane mirror 12 or by a projection optical system composed of the plane mirrors 3, 4, in-mirror lens 6, a roof mirror 7 and a plane mirror 9.

The photosensitive medium 10 is formed of a photosensitive drum having an electrophotographic photosensitive layer provided on the circumference in a known manner. The drum 10 is rotated in the direction of arrow 11 not only during the forward scanning time but also during the backward scanning time of the original. The photosensitive drum 10 is slitwise exposed to the original image. To define the slit-like exposure area whose long side extends in the direction along the generating line of the drum, that is, in the direction normal to the direction in which the drum 10 is moved, there is disposed a slit plate 5 in the optical path between the original table 1 and the mirror 3. The slit plate 5 has a slit opening 5" provided for limiting the width of the original image forming beam relative to the direction of original scanning. The long side of the slit opening 5" extends in the direction normal to the direction of the original being scanned (the moving direction of mirrors 3 and 4 described later). The slit plate 5 may be disposed in the vicinity of the photosensitive drum 10. In either case, an optical image of the original 2 is slitwise exposed on the drum 10. A lamp 8 illuminates the original.

In the manner well known in the art, the photosensitive drum 10 is electrically charged uniformly by a corona discharger B and then it is subjected to a slit exposure of the original image at the position indicated by A. By this exposure there is formed on the photosensitive drum 10 an electrostatic latent image which is then developed by a developing device C. The toner image obtained by the development is then transferred onto a sheet of paper P moving in the direction of arrow under the action of a corona discharger D. The transferred toner image on the paper P is fixed on the paper by a fixing device E. On the other hand, after transferring, the photosensitive drum is cleaned up by a cleaning device F.

The original 2 is scanned by the mirrors 3 and 4. To this end, the mirrors 3 and 4 are reciprocally moved in parallel to the original and in synchronized relation with each other between the position indicated by solid and the position suggested by phantom mirrors 3', 4'. To keep constant the optical length between the original and the photosensitive drum, the mirror 4 is moved in the same direction as the mirror 3 but at a half ($\frac{1}{2}$) speed of the running speed of the mirror 3. Since the slit plate 5 and the lamp 8 is mounted on the same carriage on which the mirror 3 is mounted (the carriage is not shown in the drawing), the slit plate 5 and lamp 8 move together with the mirror 3. Means for moving the mirrors 3, 4, slit plate 5 and lamp 8 in the manner described above is well known in the art and therefore need not to be further described.

A forward scanning of the original is performed during the time when the mirrors 3, 4, slit plate 5 and lamp 8 are together moved from the position indicated by solid (starting point of forward movement) to the position suggested by phantom 3', 4', 5', 8' (end point of forward movement) in the direction of arrow 15. A backward scanning of the original is performed during the time when the mirrors 3, 4, slit plate 5 and lamp 8 are moved back in the direction of arrow 16 from the position suggested by phantom to the position indicated by solid. During the forward scanning time and also during the backward scanning time, the light coming from the original passes through at first the slit opening 5" and then it is reflected successively by the mirrors 3 and 4 toward the lens 6. The light entering the lens 6 is reflected by the mirror 6' of the lens and then exits from the lens.

During the forward scanning, that is, when the mirrors 3 and 4 are moved forwards in the direction of arrow 15, the roof mirror 7 is in the optical path at the downstream side of the lens 6. Namely, during the forward scanning, the roof mirror 7 takes the position suggested by phantom.

FIG. 2 shows the structure of the roof mirror 7 as viewed in the direction of arrow X in FIG. 1. As seen in FIG. 2, the roof mirror 7 has a first reflecting plane surface 71 and a second reflecting plane surface 72. The two reflecting plane surfaces 71 and 72 intersect at right angles. In FIG. 2, a ray a is at first reflected by the reflecting surface 71 and then reflected by the reflecting surface 72 whereas another ray b is reflected by the reflecting surface 72 and then by intersection 73. As readily understood from the running courses of the rays, the roof mirror 7 can invert the image in regard to the direction normal to the intersection 73 of the two reflecting planes 71 and 72 (the vertical direction as viewed in the drawing of FIG. 2). The angle $\theta$ at which the two reflecting planes 71 and 72 intersect, is preferably 90°. However, the intersectional angle $\theta$ is not necessarily always 90°. The angle may be acute or obtuse. In any case, the roof mirror 7 is disposed in such manner that the intersection 73 is orientated toward the direction normal to the longitudinal direction of the slit opening 5" or to the generating line of the photosensitive drum 10.

As previously described, during the forward scanning of the original, the image forming beam exiting from the lens 6 is incident on the roof mirror 7. After reflected by the two reflecting surfaces of the roof mirror 7, the image forming beam runs toward the plane mirror 9 along the optical path $L_2$. The plane mirror 9 reflects the image forming beam to the exposure position A. This mirror 9 is fixedly mounted on the machine frame 0 so that the mirror remains stationary in the optical path $L_2$.

The roof mirror 7 is fixed to one end of an arm 13 the other end of which is supported by a pivot 14 fixed to the machine frame 0. Therefore, the arm 13 is swing movable about the pivot 14. A tension spring 17 is disposed between the arm 13 and the machine frame 0. One end of the spring 17 is anchored to the arm and the other end is anchored to the machine frame. This tension spring 17 biases the arm 13 to clockwise rotation about the pivot 14. The arm 13 is also in engagement with an electromagnetic plunger 18. When the plunger 18 is energized, it rotates the arm 14 counter-clockwise about the pivot 14 against the force of the spring 17 thereby moving mirror 7 down to the position indicated by solid 7' from the position indicated by phantom 7. When the plunger 18 is deenergized, the mirror 7 is moved up to the phantom line position 7 from the solid line position 7' by the elastic force of the spring 17. The rotational movement of the arm 13 is limited by stoppers 19 and 20. In the course of upward movement of the arm by the spring force, the arm 13 abuts against the stopper 19 by which the roof mirror 7 is positioned in the position indicated by phantom lying in the optical path $L_1$ of the image forming beam. In the course of downward movement of the arm by the action of the plunger 18, the arm 13 abuts against the stopper 20 by which the roof mirror 7 is positioned in the solid line position out of the above mentioned optical path $L_1$. In this retracted position indicated by solid, the roof mirror 7 can not take any part in forming an image on the photosensitive drum 10.

During the forward scanning time, the plunger 18 remains deenergized. It is energized after the mirrors 3, 4 slit plate 5 and lamp 8 have reached the respective end positions 3', 4', 5' and 8' and before they start returning back in the direction of arrow 16. In other words, the plunger 18 is energized at a time point between the end of a forward scanning and the start of a backward scanning subsequent to it. When the plunger 18 is energized, the roof mirror 7 is retracted to the solid line position 7' out of the optical path of the image forming beam in the manner described above. Therefore, in this position, the image forming beam from the lens 6 is incident on the stationary plane mirror 12 but not on the roof mirror 7'. The plane mirror 12 reflects the beam toward the position A along the optical path $L_3$ which does not pass through the mirror 9. In other words, the mirror 9 is disposed in the optical path $L_2$ at a position out of the optical path $L_3$. In the retracted position, the roof mirror 7 never obstructs the running of the beam reflected by the mirror 12 along the optical path $L_3$.

As previously noted, the optical path $L_1$ of image forming beam extending from the original to the roof mirror 7 in the phantom line position is common to the forward scanning and the backward scanning. But, the optical path extending from the phantom position to the photosensitive drum 10 is $L_2$ for the forward scanning and $L_3$ for the backward scanning. The optical paths $L_2$ and $L_3$ are different from each other. Thus, the roof mirror 7, when it is in the working position before the stationary mirror 12, reflects the image forming beam passed through the lens 6 in the direction different from the direction in which the beam is reflected by the stationary mirror 12. When the roof mirror 7 is positioned in its working position by the stopper 19, the intersection of the two reflecting surfaces of the roof mirror 7 is somewhat inclined to the stationary mirror.

In any event, the focused state of the image on the photosensitive drum during the forward scanning and that during the backward scanning must desirably be equal to each other. To satisfy this requirement, it is desirable that the working position of the roof mirror 7 indicated by the broken line and the position of the stationary mirror 9 should be selected in such manner that the optical path length from the lens 6 to the drum 10 through the roof mirror 7 in the working position and the mirror 9 is substantially equal to the optical path length from the lens 6 to the drum 10 through the mirror 12. Further, it is preferable that the mirror 9 be so disposed as to reflect the image forming beam reflected by the roof mirror 7 toward the same exposure position A as the beam is directed to by the stationary mirror 12 during the backward scanning. However, the image exposure position on the photosensitive drum during the forward scanning may be slightly different from that during the backward scanning.

In summary, according to the invention, the roof mixture 7 is in its working position indicated by broken line or phantom only when the original is scanned forwards. In this position, the optical path for the image forming beam is formed by mirrors, 3, 4, lens 6, roof mirror 7 and mirror 9. When the original is scanned backwards, the plunger 18 is energized and the roof mirror 7 is retraced to its non-working position indicated by solid line. In this position, the optical path for the image forming beam is formed by mirrors 3, 4, lens 6 and mirror 12. With this arrangement of the invention, the original can be correctly copied not only by a forward scanning but also by a backward scanning of the original. This is because during the forward scanning, the roof mirror 7 effects an inversion of the original image on the photosensitive drum relative to the original image formed during the backward scanning in regard with the direction of the generating line of the drum or the longitudinal direction of the slit and also the mirror 9 effects an inversion of the original image relative to that formed during the backward scanning with regard to the direction of the drum being moved or the direction normal to the longitudinal direction of the slit. In brief, the roof mirror 7 and mirror 9 together have an effect of changing the orientation of the original image on the drum 10 by 180° relative to the original image on the drum during the backward scanning. By this effect it is made possible to obtain correct copies of an original during the forward scanning as well as during the backward scanning while using a photosensitive drum rotating always in the same direction.

While the invention has been particularly shown and described with reference to a preferred embodiment thereof, it will be understood by those skilled in the art that various modifications and changes may be made therein in the light of the above teachings. For example, the positions 3', 4', 5' and 8' suggested by phantom may be selected as the starting points for forward running of mirrors 3, 4, slit plate 5 and lamp 8. In this case, the original is forward scanned by these elements 3, 4, 5 and 8 moving in the direction of arrow 16. When they run in the direction of arrow 15, a backward scanning of the original is performed. The roof mirror 7 is brought to its working position indicated by broken line when the backward scanning is carried out.

The roof mirror 7 may be fixed stationary, for example, at the position of mirror 9 in FIG. 1, while the plane mirror 9 is attached to the arm 13.

Further, there may be a prism having a roof reflecting surface as the roof mirror 7.

The mirrors 3, 4 slit plate 5 and lamp 8 may be mounted stationary on the machine frame 0 while reciprocally moving the original table 1 above the slit opening 5" using a known original table moving means. In this modification, the original is scanned with the reciprocal movement of the original table 1. The roof mirror 7 is moved to its working position indicated by phantom when the original table 1 is moved in the direction of arrow 16. When the original table is moved in the direction arrow 15, the roof mirror is retracted to the position indicated by solid in FIG. 1.

As another modification, the original may be reciprocally moved above the slit opening 5" using a known original conveying means such as belt and roller. Also, in this case, the roof mirror 7 is brought to its working position when the original is moved in the direction of arrow 16 and it is retracted to non-working position when the original is moved in the direction of arrow 15.

The present invention is applicable also to an electro FAX type copying machine in which a photosensitive paper is used as copying paper and an image is fixed on the photosensitive paper.

What is claimed is:

1. A copying apparatus comprising:
   scanning means for scanning an original to be copied in a first direction or alternatively in a second direction opposite to said first direction;
   first reflecting means disposed in a first optical path which the light for forming an image of said original on a photosensitive medium passes through during the original scanning in said first direction;
   second reflecting means movable between first and second positions, wherein said second reflecting means when being in the first position during the original scanning in said first direction takes no part in forming the image but during the original scanning in said second direction said second reflecting means is in the second position in which it forms a second optical path different from said first optical path and takes a part in forming the image; and
   third reflecting means disposed in said second optical path to project the original image on said photosensitive medium during the original scanning in said second direction, wherein said second and third reflecting means cooperate to change the orientation of the original image on said photosensitive medium by 180° relative to that formed during the original scanning in said first direction.

2. A copying apparatus as set forth in claim 1, wherein said first reflecting means is a plane mirror, one of said second and third reflecting means is a roof reflecting mirror and the other is a plane mirror.

3. A copying apparatus as set forth in claim 1 or 2, wherein the second position which said second reflecting means takes during the original scanning in said second direction is located before said first reflecting means.

4. A copying apparatus as set forth in claim 3, wherein said third reflecting means is disposed between said second position and said photosensitive medium.

5. A copying apparatus as set forth in claim 1 or 2, wherein said third reflecting means is positioned in such manner that said reflecting means can reflect the light coming from the original toward said photosensitive medium in such direction in which the original image can be formed on said photosensitive drum at the substantially same position as the original image is formed during the original scanning in said first direction.

6. A copying apparatus as set forth in claim 1 or 2, wherein said photosensitive medium moves in the same direction for both of the original scanning in said first direction and the original scanning in said second direction.

* * * * *

UNITED STATES PATENT AND TRADEMARK OFFICE
CERTIFICATE OF CORRECTION

PATENT NO. : 4,353,638

DATED : October 12, 1982

INVENTOR(S) : WILHELM KNECHTEL

It is certified that error appears in the above-identified patent and that said Letters Patent is hereby corrected as shown below:

COVER PAGE
Column 1

Insert -- [30] Foreign Application Priority Data
July 15, 1980 West Germany
Patent Application No. 30 26 758 --.

Signed and Sealed this

Seventeenth Day of July 1984

[SEAL]

Attest:

GERALD J. MOSSINGHOFF

Attesting Officer     Commissioner of Patents and Trademarks